Dec. 8, 1936.  E. N. KEMLER  2,063,169
MECHANICAL DYNAMOMETER
Filed May 6, 1936  4 Sheets-Sheet 2
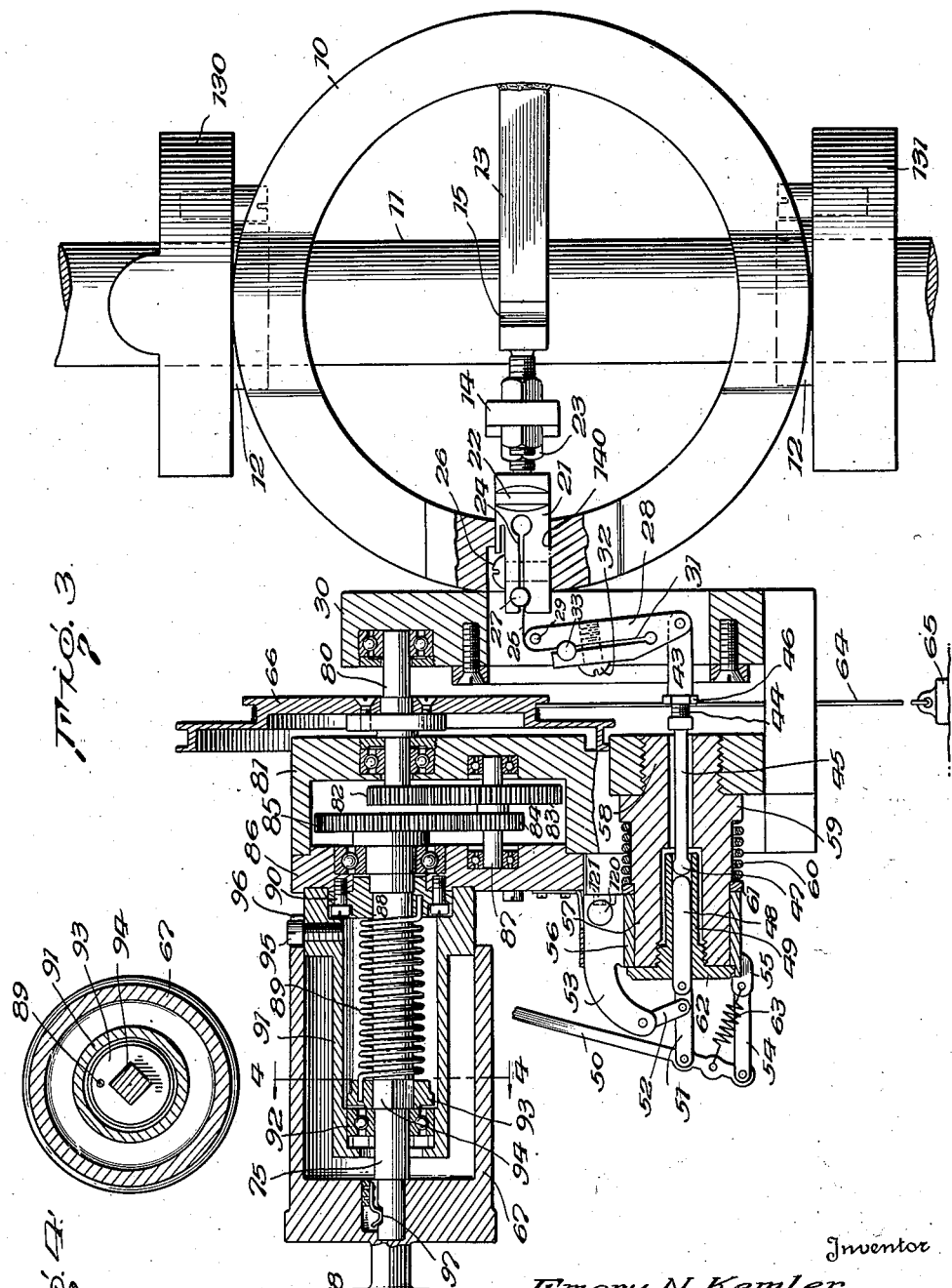
Inventor
Emory N. Kemler,
By A. M. Houghton
His Attorney

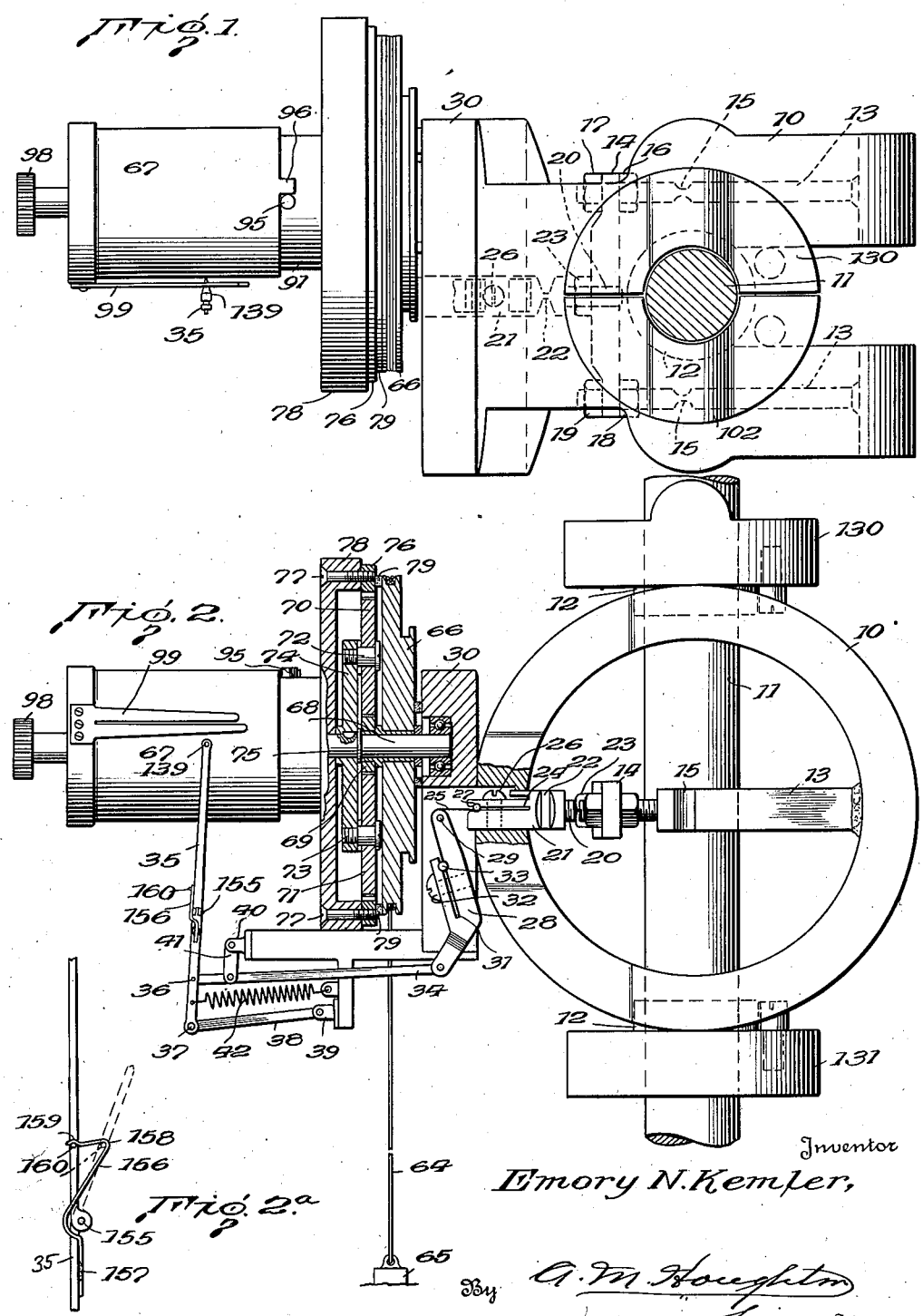

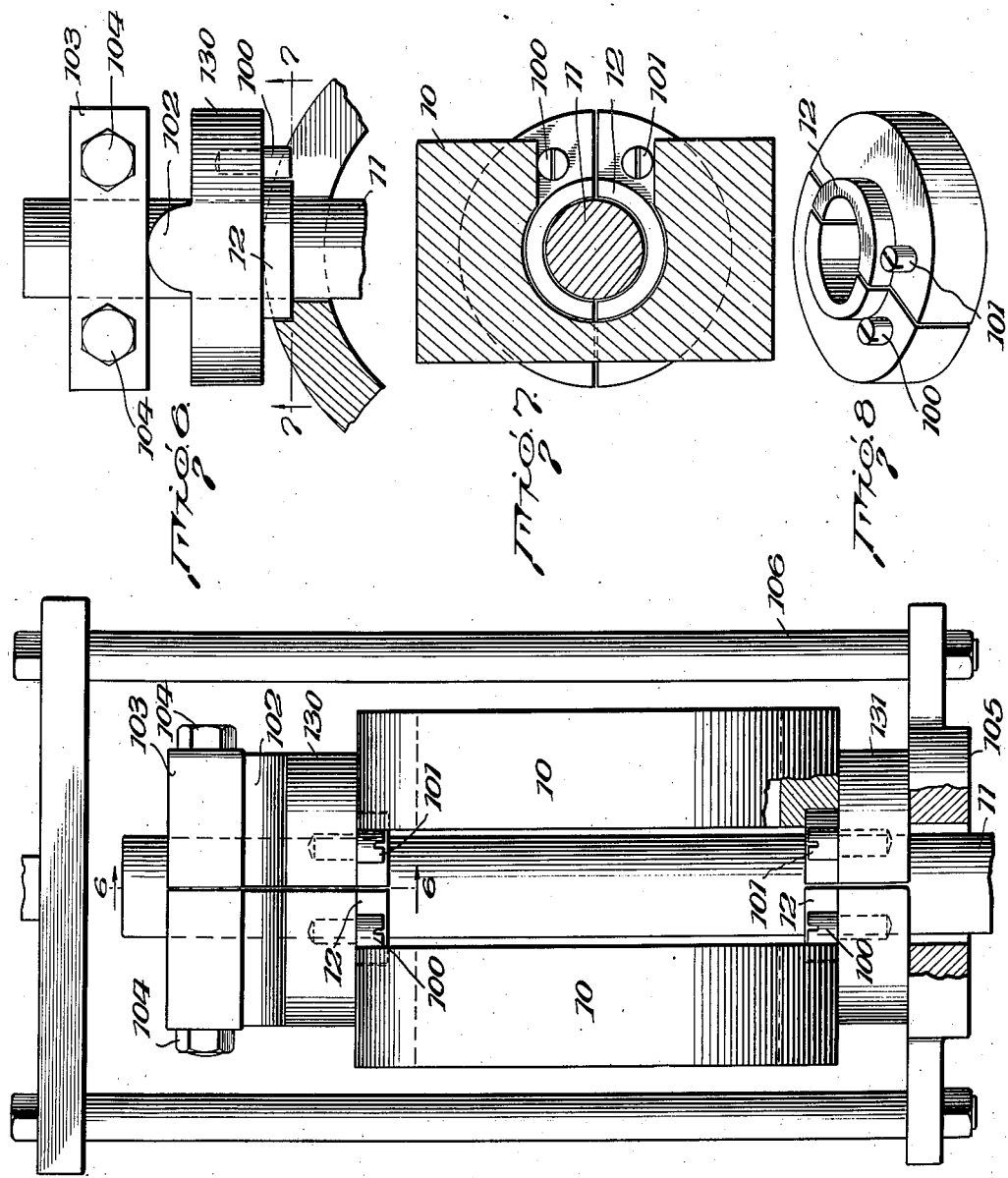

Dec. 8, 1936.   E. N. KEMLER   2,063,169
MECHANICAL DYNAMOMETER
Filed May 6, 1936   4 Sheets-Sheet 4
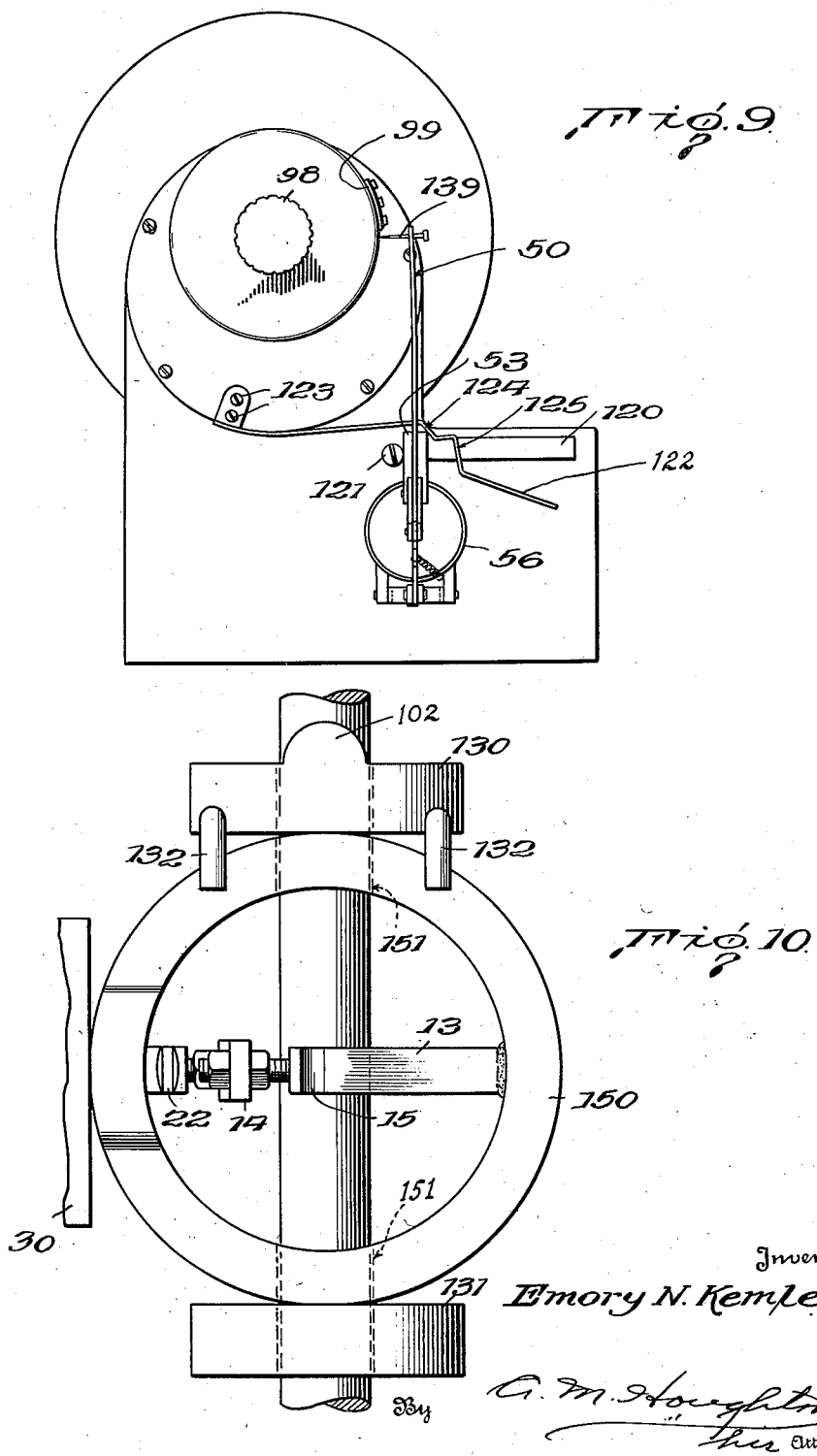
Inventor
Emory N. Kemler,
By G. M. Houghton
his Attorney Patented Dec. 8, 1936

2,063,169

UNITED STATES PATENT OFFICE 2,063,169

MECHANICAL DYNAMOMETER

Emory N. Kemler, Glenshaw, Pa., assignor to Gulf Research & Development Company, Pittsburgh, Pa., a corporation of Delaware Application May 6, 1936, Serial No. 78,284

8 Claims. (Cl. 265—2)

This invention relates to mechanical dynamometers; and it comprises apparatus for measuring and indicating or recording strains in mechanism, comprising a deformable member adapted to be applied to an element of the mechanism under stress and to be deformed or strained under stress, a record sheet, mechanical means for transmitting and magnifying the strain of the deformable member and producing an indication thereof upon the record sheet in one direction proportional to the strain of said deformable member, and means for simultaneously oscillating said record sheet in another direction, to secure a closed diagram of strain versus motion on the record sheet; all as more fully hereinafter set forth and as claimed.

In an oil well the pump is located far underground, and the piston is reciprocated from the surface through a string of sucker rods and a "polished rod" connected to the walking beam of the pumping rig. The polished rod extends through a stuffing box in the well tubing and at its lower end is connected to the string of sucker rods which extend down through the tubing to the pump piston.

The imposition of a load upon the rod string which is too great will result in breakage of the string in which event it must be fished from the well. This operation entails great expense, and causes expensive delays in well production during the necessary cessation of operations.

It is therefore of importance to analyze the conditions under which a deep well pump is operating and to ascertain the loads to which the polished rod and its attached string of sucker rods are subjected in all positions of their reciprocation.

One of the objects accomplished by this invention is the provision of a deformable ring from which the polished rod of a pump is suspended and to which its load is transmitted, with means for magnifying variations in the diameter of such ring and actuating a stylus for inscribing a closed diagram on a chart movable in accordance with reciprocations of the polished rod.

Another object is to provide a bifurcated ring which receives a polished rod between its bifurcations for suspending the same in the operation of a deep well pump, means separably movable by deformation of each ring section and connected to give a net movement in the event of eccentric loading which would produce unequal deformations of the ring sections, the movements of ring deformation being magnified and transmitted to a recording stylus which inscribes a closed diagram upon a chart movable in accordance with reciprocations of the polished rod.

Other and further objects will appear from the following description and drawings, in which Fig. 1 is a plan view of one embodiment of the present invention, the polished rod being shown in section;

Fig. 2 is a side view, partly in section;

Fig. 2A is a fragmentary view of a portion of Fig. 2;

Fig. 3 is a side view, partly in section, showing the mounting of the chart drum, and a modified form of motion magnifying and transmitting means through which the recording stylus is actuated;

Fig. 4 is a sectional view, taken along the line 4—4 of Fig. 3;

Fig. 5 is a view from the right of Figs. 1 and 2, showing attachment of bifurcated ring to the polished rod and its suspension from the stirrup at the end of a walking beam;

Fig. 6 is a fragmentary detail view along the line 6—6 of Fig. 5;

Fig. 7 is a sectional view, along line 7—7 of Fig. 6;

Fig. 8 is a perspective view of one of the split collars by which the polished rod is suspended from the walking beam of a pumping rig through the medium of the bifurcated ring;

Fig. 9 is an end view of the apparatus of Fig. 3 to show the means for holding the stylus against or away from the drum; and Fig. 10 is a fragmentary elevational view of a modification utilizing a simple annulus in lieu of a bifurcated ring.

Referring more particularly to the drawings:

The bifurcated ring 10 is slipped onto the polished rod 11 from the side so that the ring sections straddle the polished rod as shown in Fig. 1. The crotch of the ring is of greater diameter than the distance between its bifurcations and is adapted to receive bushings 12 which hold the ring against accidental dislodgment in the manner to be subsequently described.

Rigid metal strips 13 are welded or otherwise attached to the inner surfaces of the ring sections in the region of their maximum deformation under load. These strips extend diametrically across the ring sections and their free ends are threaded to receive the connecting yoke 14. Cardan hinges 15 in the strips 13 are provided to take care of slight misalignment such as might be caused by the spreading apart of the ring section.

The yoke 14 is attached to strips 13 by nuts 16, 17, 18 and 19 which further serve as means for adjusting its position with respect to the strips. At its midpoint the yoke is tapped to receive the threaded shank 20 of a link 21 which, like the strips 13, has a Cardan hinge 22 to make it flexible in this region and permit its adaptation to irregularities in the position of the yoke. A lock nut 23 preserves the adjustment of the link 21 relative to the yoke. Link 21 is adapted to slide back and forth freely in an opening 140 in the ring. A slot 24 is formed in link 21 for reception of a flexible strap 25, and a screw 26 serves to close the slot and so clamp the strap in place, being assisted in this by a pin 27 which presses into the strap and exerts a snubbing action to prevent its slipping.

The strap passes over the rounded end of a lever 28 which is pivoted at 29 on the housing or frame 30 to which ring 10 is also attached, and at its opposite end the strap enters slot 31 in the lever where it is clamped by the screw 32 and is prevented from slipping by pin 33, similar to pin 27. Lever 28 magnifies the motion of link 21 in response to flattening of the ring under load, the motion so magnified being transmitted to a recording stylus by linkage having substantially straight line motion.

One form of linkage is shown in Fig. 2. This comprises an arm 34 pivotally connecting the end of lever 28 with the stylus arm 35 at a point 36 near its fulcrum 37. A stylus 139 is provided on the end of arm 35, as shown. A link 38 connects the stylus arm at its fulcrum with the bracket 39 which is pivotally attached to the frame 30 and the arm 34 is also connected to a similar bracket 40 on the frame by a connecting link 41. A spring 42 attached at its ends to the stylus and frame respectively urges the linkage and rocking lever 28 in a direction to maintain the strap 25 taut. This system of transmitting motion from the strips 13, through the rocking lever 28 is designed to give the stylus on the end of arm 35 a substantially straight line motion.

An alternative arrangement of linkage is shown in Fig. 3 wherein an arm 43 is pivoted to the lever 28 and is tapped to receive the threaded end 44 of a push rod 45 so that the effective length of the push rod may be varied and the rod locked in a selective position by nut 46. The push rod has a rounded head 47 in contact with the rounded end of a link 48 which is guided for straight line movement in the bore of a bushing 49. Movement of the link 48 is transmitted to the stylus arm 50 by link 51 to which the swinging link 52, depending from a bracket 53 on the frame, is attached. A link 54, parallel to link 51, connects the end of the stylus arm 50 with the bracket 55 on the frame. The brackets 53 and 55 are carried by a tubular sleeve 56 which fits over the end of a boss 57 projecting from the frame or housing generally designated by the numeral 30. The boss may conveniently be made with a threaded end 58 received in the wall of the housing and an abutment shoulder 59 against which one end of a helical spring 60 bears. The other end of the spring presses against a washer 61 and urges the sleeve 56 outwardly into contact with the enlarged head 62 of the bushing 49. Since the bushing is threaded into the bore of boss 57 as shown in Fig. 3, it will be held by spring pressure against displacement.

A spring 63 which extends between bracket 55 and the stylus arm 50 urges the linkage and rocking lever 28 in a direction to maintain the strap 25 taut as in the form of invention above described.

In order to provide a closed diagram for recording movement transmitted to the stylus, a cylinder chart is rotated alternately in opposite direction as the polished rod reciprocates. The chart is carried by a drum which is rotated through suitable reduction gearing by a pulley upon which is wound a cable secured at its free end to the ground or to any stationary part of the mechanism under test.

In the drawings, a cable 64 is anchored at one end as at 65 and is wrapped a number of times about a pulley 66 which may conveniently be of step type in order that the drum may be rotated at different speeds depending upon whether the polished rod has long or short reciprocating travel.

In the embodiment of the invention shown in Fig. 2, rotation of the pulley 66 is transmitted to the drum 67 by epicyclic gearing, the pulley being keyed or otherwise affixed to a stud shaft 68 which is journaled in anti-friction bearings mounted in the frame 30. A pinion 69, also rotatable with the stud shaft, meshes with gears 70 and 71 which are carried on studs 72 and 73 projecting from the face of a plate or arm 74, rotatable with the drum shaft 75. The gears 70 and 71 also mesh with an internal ring gear 76 which is mounted by screws 77 on a cup-shaped part 78 of the fixed housing. Thus, as the pulley 66 rotates the drum 67 will be rotated through gears 70 and 71, but to a less extent than the pulley.

The part 78 of the frame constitutes a housing for the gear frame from which dust and dirt may be excluded by a packing 79 interposed between the ring gear and the inner face of pulley 66.

In Fig. 3, the drum is driven through conventional reduction gearing. The pulley 66 is mounted on shaft 80 which is supported in anti-friction bearings located in counter-bore recesses in the portions 81 and 30 of the fixed frame. The pinion 82 on shaft 80 meshes with a larger gear 83 which is rotatable with pinion 84, both being mounted on the stud shaft 87. The pinion 84, in turn, engages a gear 85 on the drum shaft 75. The reduction gearing is conventionally housed in a recess formed in the wall 81 of the housing, such recess being closed by a plate 86 through which the drum shaft extends and which is supported by anti-friction bearings as shown in the drawings. A collar 88 surrounding the drum shaft serves as an anchor for one end of a helical spring 89, being fixed to the cover plate 86 of the housing by screws 90. A tubular sleeve 91 surrounds the drum shaft and is spaced from it to receive an anti-friction bearing 92 adjacent its outer end for the further support of the drum shaft. A collar 93 engages a squared portion 94 of the drum shaft to prevent its turning thereon, this collar serving to anchor the opposite end of the helical spring 89. Thus when the drum shaft 75 is rotated in one direction by the pulley 66 the helical spring will be tensioned so that upon reversal of the polished rod carrying the mechanism, the spring 89 will reversely rotate the drum shaft and the pulley 66 to rewind the cable thereon.

A screw 95 is threaded into the sleeve 91 and projects outwardly therefrom to constitute a stop against which a lug 96 extending from the end of drum 67 abuts. The screw 95 in this manner permits rotation of the drum 67 with shaft 75 to approximately 360° but is prevented from further rotation by contact of a lug 96 against the screw 95.

At its outer end the chart drum 67 is bored to receive the end of shaft 75 and carries a spring detent 97 which engages a notch in the shaft 75 to cause rotation of the two in unison but permitting the drum to be withdrawn when desired. A knob 98 on the end of the drum provides a convenient means for its removal. The leaf spring 99 is provided to hold the paper record or "card" on the drum.

In mounting the apparatus upon the polished rod 11 of a pump the bifurcated ring is slipped on to the rod from the side and as previously explained is retained by the bushings 12. As shown in the drawings these bushings are integrally formed with split collars 130 and 131 which surround the polished rod above and below the ring respectively. Screws 100 and 101 project into the space between the bifurcations with ring 10 in the manner shown in Fig. 7 and thereby prevent shifting of the ring with respect to the bushing 12 and collars integral therewith. The upper collar as shown in Fig. 6 is formed with a rounded edge 102 bearing upon the under-surface of a clamp 103 which grips the upper end of the polished rod through pressure applied by bolts 104. The lower collar seats upon a clamp holder 105 of a hanger 106 which loosely surrounds the polished rod and which is suspended at its upper end from the walking beam of a pump rig. Thus the polished rod load is carried by the walking beam through the upper yoke of the hanger 106, the carrier bar 105 of the hanger, the lower collar, the dynamometer ring, the upper collar and the rod clamp which is fastened to the polished rod.

By providing the ring in bifurcated form as shown, easy application of the apparatus to the polished rod and easy withdrawal therefrom are assured. However, many advantages of the invention are secured if a solid ring, that is to say a single annulus, suitably pierced for reception of the polished rod, be provided. Such a modification is shown in Fig. 10. A single annulus 150 is provided, pierced with two diametrically opposite bores 151 for reception of the polished rod. The attachment of element 13 is similar to the arrangement in Figs. 2 and 3, and the drum and stylus mechanism is attached to the ring in the same manner as in the other embodiments. In use, the ring is slipped down over the polished rod to rest on lower collar 131 and is retained between the two collars as shown. Lugs 132 are provided on the upper collar to maintain proper relation between knife-edge 102 and the plane of ring 150.

In all embodiments of the invention the ring is arranged so as to take the full working stress, along one diameter, while changes in the diameter at right angles to this, upon straining the ring, are communicated to the stylus. This arrangement makes possible provision of simple and accurate movement-multiplying and indicating means.

To apply the indicator of Figs. 1-8 to a pumping rig, a clamp is placed on the polished rod when it is at the top of a stroke. The clamp grips the polished rod just above the stuffing box so that when the walking beam is lowered, the load is taken off the hanger. The clamp seating on the stuffing box prevents the polished rod from dropping into the well. The walking beam is now lowered until enough room is available to insert the indicator between the hanger and an upper clamp which has been fastened on the polished rod and against which the hanger normally engages. This is the no-load position in which the whole assembly is free to slide up and down on the polished rod. The drum 67 is rotated once by hand in this position to obtain a zero line.

In order to apply load, the walking beam is raised, bringing the hanger and indicator up along the polished rod until the rounded edge of the top collar rises against the upper polished rod clamp. Then as the walking beam is raised still further, the ring is put in compression as it then supports the entire rod string. The lower clamp which was used to hold the polished rod during attachment of the dynamometer thereto is now removed and the well pumped in a normal manner. For one complete cycle of operation, the stylus is allowed to rest against the drum to obtain the card.

Figs. 2 and 2A show one arrangement for keeping the stylus arm against the drum or away from it as desired. As shown, the arm (35) is hinged as at 155, to allow the upper portion, carrying the stylus, to be swung towards or away from the drum. A spring 156, of the form shown, is attached to the lower portion of the arm as at 157, and has two detent portions 158 and 159. The upper portion of the stylus arm is provided with a pin 160 adapted in one position (shown in full lines in Fig. 2A) to engage detent 159, whereby the stylus is held against the drum, and in another position (shown in dotted lines in Fig. 2A) to engage detent 158, whereby the stylus is held away from the drum.

Fig. 9 is an end view of the apparatus of Fig. 3, to show the arrangement used in this modification for holding the stylus against or away from the drum as desired. This device is operated manually. As shown in Figs. 3 and 9, sleeve 56 is arranged for rotation about the axis of boss 57, spring 60 being selected to prevent end play of sleeve 56 and yet permit free rotation. A handle 120 is provided on bracket 53 for convenience of operation, and the bracket normally rests against a stop 121, as shown (Fig. 9), so that the stylus 139 on arm 50 rests against the record drum. A leaf spring 122 is provided, attached to element 86 by screws 123 and having two step portions, 124 and 125 as shown. The normal operating position of the apparatus is as in Fig. 9, bracket 53 being held against the stop by step portion 124. When it is desired to raise the stylus away from the drum, after taking a card, spring 122 is lifted and sleeve 56 is rotated clockwise, bringing bracket 53 in step 125 where it is retained by the downward pressure of spring 122.

From the foregoing it is apparent that this invention provides means for measuring load variations and consequently strains to which a moving part is subjected by transforming distortions of a ring from circular shape into magnified movements of a stylus in contact with a chart which is moved proportionately to movement of the mechanical part under test.

In the apparatus of the present invention, the strain which is actually measured is that of the deformable ring. The stress corresponding to this strain can readily be determined, once the elastic characteristics of the ring are known. The characteristics of the ring can be determined once and for all, and need be checked only occasionally. The apparatus thus has advantage over systems wherein the strain of the polished rod (or the like) itself, is directly measured. In such cases the elastic properties of the rod must be found, either by supplementary tests on each polished rod or (less accurately) by calculations based on the size and shape of the rod and the material of which it is made. Characteristics of polished rods are seldom known accurately, especially in wells where pitting of the polished rod takes place.

What I claim is:—

1. A mechanical dynamometer for measuring strains in mechanism at all operating positions and for producing a compound indication of strain and motion, said dynamometer comprising a resilient member of known elastic properties, so constructed and arranged as to be applied to an element of the mechanism under stress so as to transmit the stress to the mechanism and to be strained by said stress, mechanical means for transmitting and magnifying the strains in said member and producing an indication thereof upon a record sheet in one direction proportional to the response of said strain responsive member, and means for simultaneously moving said record sheet in another direction, in a cyclically oscillating movement to produce an indication proportional both to strain and to motion in the form of a closed diagram on said record sheet of the part to which said strain responsive member is attached.

2. A mechanical dynamometer for measuring strains in mechanism at all operating positions and for producing a compound indication of strain and motion, said dynamometer comprising a resilient member of predetermined elastic properties, so constructed and arranged as to be applied to an element of the mechanism under stress and to transmit said stress to the mechanism element and to be strained by said stress, mechanical means for transmitting and magnifying the strains in said member and producing an indication thereof upon a record sheet in one direction proportional to the response of said strain responsive member, and means for simultaneously moving said record sheet in another direction, in a cyclically oscillating movement proportionally to motion of a part of the mechanism to which said strain responsive member is attached so as to produce a compound movement proportional both to strain and motion in the form of a closed diagram on said record sheet.

3. A mechanical dynamometer for measuring strains in reciprocating mechanism at all operating positions thereof and for producing a compound indication of strain and motion, said apparatus comprising a deformable ring supporting an element of the mechanism under stress and adapted to be distorted by loads imposed upon such element, a lever for magnifying the distortional movements of said ring under stress, mechanical linkage for transmitting such magnified movements and adapted to give substantially straight line motion, a stylus actuated by said linkage for producing an indication of loads causing distortion of said ring upon a record sheet in one direction, a record chart movable to extreme positions corresponding to the extreme positions of the mechanism under test in its reciprocation, driving means for said record chart responsive to reciprocation of the mechanism and reduction gearing through which said driving means effects movement of the record chart proportionally to the reciprocation of the mechanism under test, thereby producing a closed diagram on said record sheet.

4. A mechanical dynamometer for measuring strains in reciprocating mechanism in the various operating positions thereof and to produce a compound indication of strain and motion, said dynamometer comprising a deformable ring to which the load of a mechanical part under test is transmitted at a point diametrically opposite the support for said ring, the ring thus being adapted to be deformed by the stresses transmitted to it from such element, mechanical linkage responsive to the variations in diameter of said ring under stress for magnifying the movements thereof under distortion and for actuating a recording stylus, an oscillatable record chart upon which such stylus makes a record in one direction proportional to the stress which causes deformation of said ring, a pulley for driving said drum through reduction gearing, a cord wound about said pulley and attached at one end to a point fixed with respect to the movement of the mechanism under test, whereby upon reciprocation of such mechanism, the movement of said pulley will be the same as that of the reciprocated mechanism under test and said record chart will be oscillated in alternate directions through said reduction gearing proportionally to movement of said pulley and said reciprocating mechanism, thereby to produce a compound indication proportional both to strain and motion in the form of a closed diagram on said record sheet.

5. Apparatus for measuring strains in reciprocating mechanism at all operating positions thereof and to produce a compound indication of strain and motion, said apparatus comprising a bifurcated ring, the sections of which are adapted to receive the part under test between them, means for mounting the bifurcated ring to deform it by loads imposed upon the mechanism under test to which it is attached, members extending diametrically of the ring and attached thereto at one end responding to distortions in the ring under load, means for multiplying such motions and a stylus to which the motions are transmitted, and a record chart driven proportionally to the motion of the mechanism under test whereby the stylus will produce thereon a compound indication proportional both to strain and motion in the form of a closed diagram.

6. In a dynamometer, a hollow cylindrical annulus of known elastic properties and arranged for mounting on an element to be tested under stress, in such manner that stress is applied diametrically to the annulus and is transmitted by the annulus to the element, whereby under stress the diameter of the annulus increases in a direction at right angles to the direction of application of stress, means responsive to the change in such diameter under stress and arranged to give an indication in one direction proportional to such change, and means for giving an indication, in a direction different from the first, proportional to movement, so constructed and arranged that the dynamometer gives a compound indication of stress and movement.

7. In a dynamometer, a hollow cylindrical annulus of known elastic properties and arranged for mounting on an element to be tested under stress, in such manner that stress is applied diametrically to the annulus and is transmitted by the annulus to the element, whereby under stress the diameter of the annulus increases in a direction at right angles to the direction of application of stress, and mechanical means for indicating such increase in diameter, comprising movement-transmitting means symmetrically disposed adjacent each end of the cylindrical annulus, and means for averaging the movement of the two transmitting means, so that any unequal diametral changes due to unsymmetrical loading are compensated for.

8. Apparatus for measuring strains in a mechanism part under stress at all operating positions thereof and for producing a compound indication of strain and motion, said apparatus comprising ring means so constructed and arranged as to receive the part under test and to transmit stress to said part in a direction along a diameter of said ring means, whereby the ring means deforms under said stress, means attached to the ring means and so constructed and arranged as to give a magnified indication of change in a diameter of the ring means under said stress, and means arranged to be moved proportionally to movement in the mechanism and to give, in conjunction with the stress indicating means, a compound indication proportional to both strain and movement.

EMORY N. KEMLER.